(No Model.)

4 Sheets—Sheet 1.

J. B. CLYNE.
METAL SCREW MACHINE.

No. 333,198. Patented Dec. 29, 1885.

WITNESSES

INVENTOR
James B. Clyne
By Jno. Crowell
Attorneys (No Model.) 4 Sheets—Sheet 2.
J. B. CLYNE.
METAL SCREW MACHINE.
No. 333,198. Patented Dec. 29, 1885.
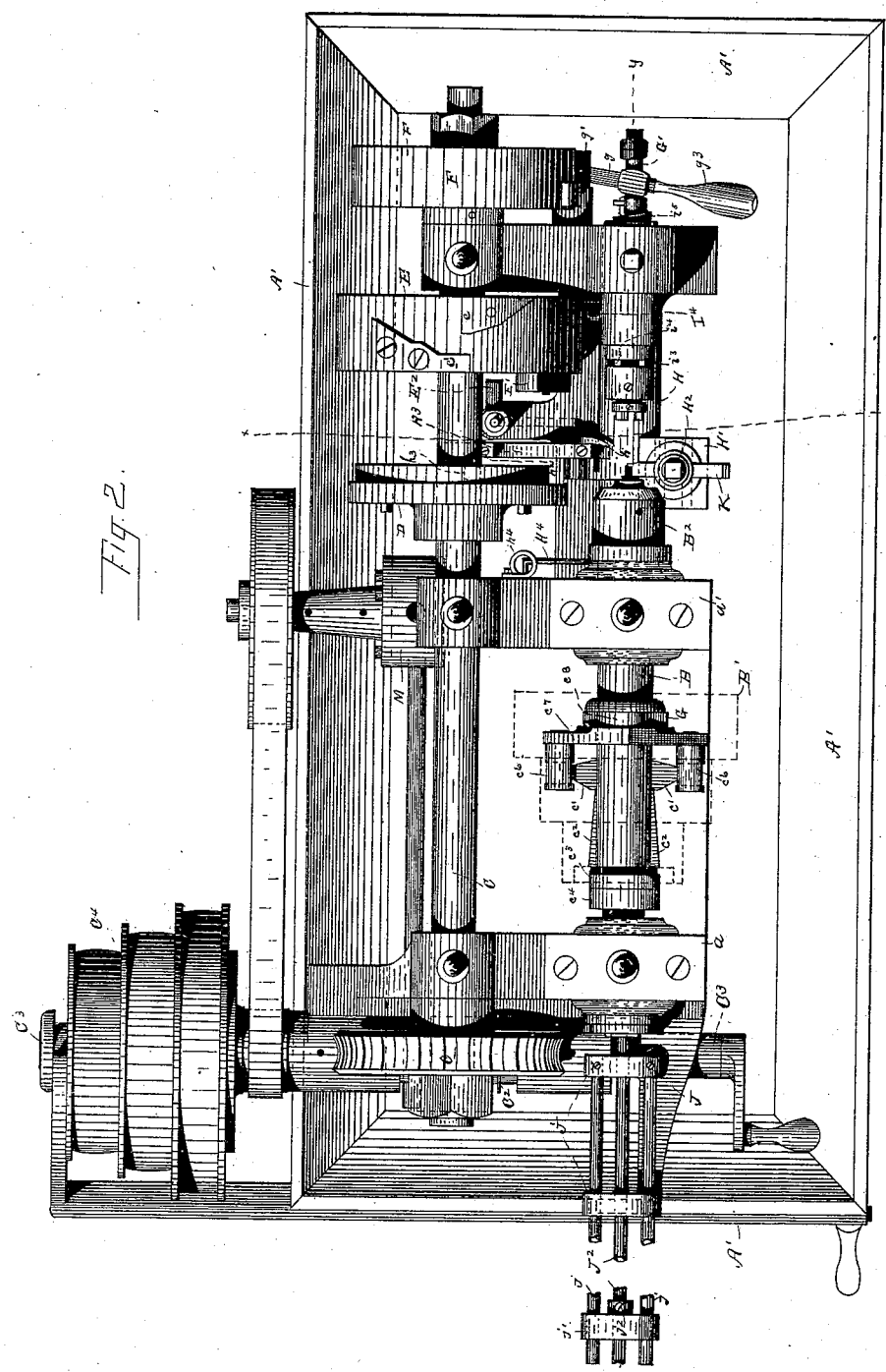

(No Model.) 4 Sheets—Sheet 3.
J. B. CLYNE.
METAL SCREW MACHINE.
No. 333,198. Patented Dec. 29, 1885.
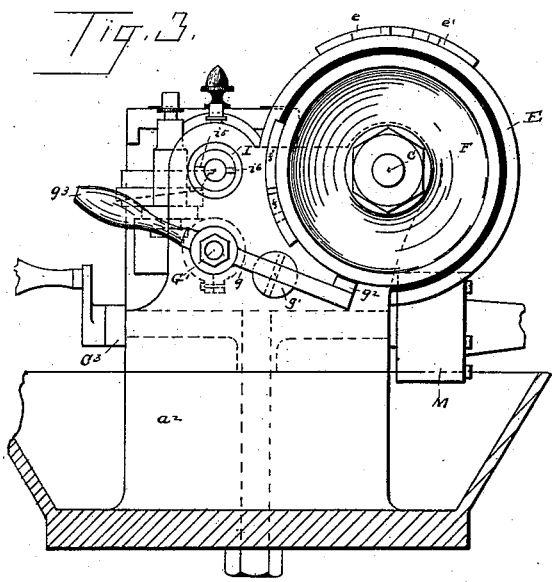
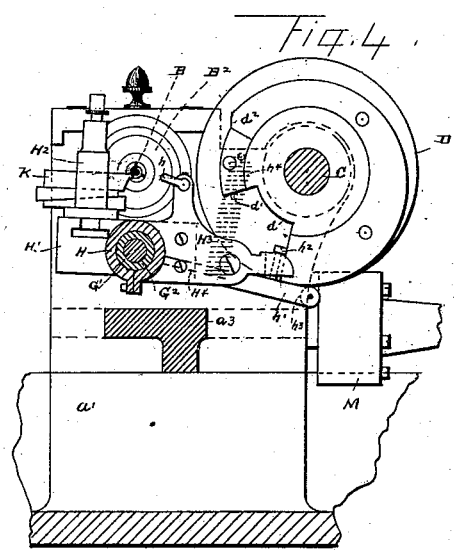
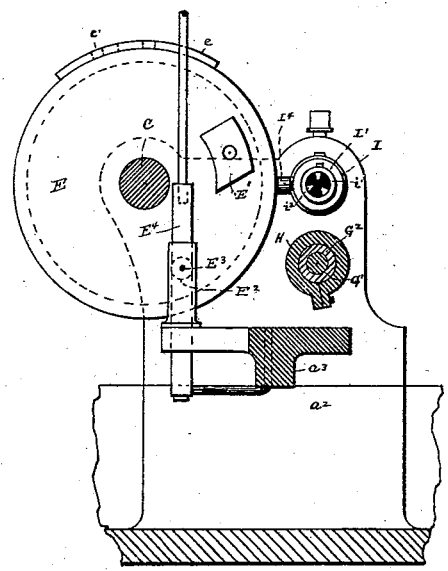
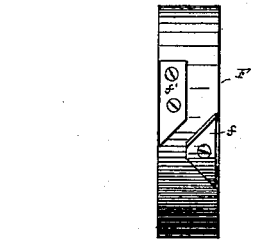
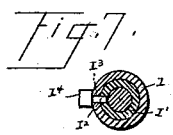
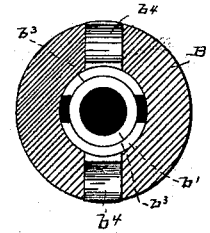
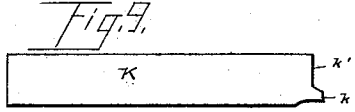
WITNESSES
N. J. Amstutz
G. W. Thurmway
James B. Clyne.
By Jno. Crowell
Attorneys
INVENTOR
N. PETERS, Photo-Lithographer, Washington, D. C.

(No Model.) 4 Sheets—Sheet 4.

J. B. CLYNE.
METAL SCREW MACHINE.

No. 333,198. Patented Dec. 29, 1885.

WITNESSES

INVENTOR
James B. Clyne.
By Jno. Crowell
Attorneys

UNITED STATES PATENT OFFICE.

JAMES B. CLYNE, OF CLEVELAND, OHIO, ASSIGNOR OF ONE-HALF TO THE WHITE SEWING MACHINE COMPANY, OF SAME PLACE.

METAL-SCREW MACHINE.

SPECIFICATION forming part of Letters Patent No. 333,198, dated December 29, 1885.

Application filed June 9, 1885. Serial No. 168,110. (No model.)

*To all whom it may concern:*

Be it known that I, JAMES B. CLYNE, of Cleveland, in the county of Cuyahoga and State of Ohio, have invented certain new and useful Improvements in Machines for Making Metal Screws; and I do hereby declare the following to be a full, clear, and exact description of the invention, such as will enable others skilled in the art to which it pertains to make and use the same.

My invention relates to improvements in machines for making metal screws, the object being to simplify the construction, to the end, first, that the initial cost of the machine be reduced, and, second, that the wear and consequently the repairs are greatly reduced.

A further object is to provide a combination-tool and means for operating the same, by means of which the threaded screw is severed and the blank is turned down from the body of the next screw at one operation, and that the tool, when its work is done, is "backed off" instantaneously, to the end that the capacity of the machine is greatly increased.

My invention also consists in the details of construction and in combination of parts hereinafter described, and pointed out in the claims.

Figure 1:
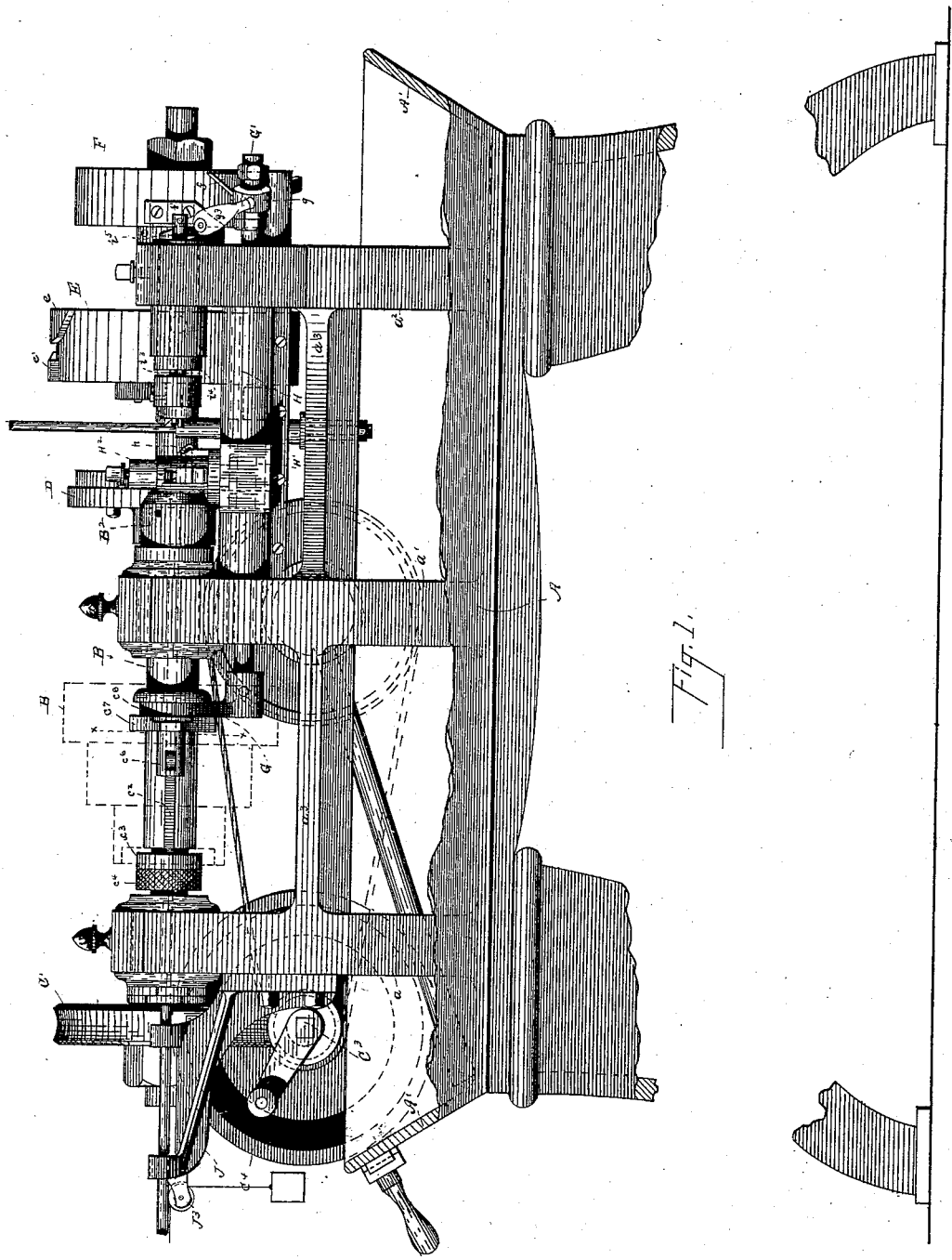
Figure 10:
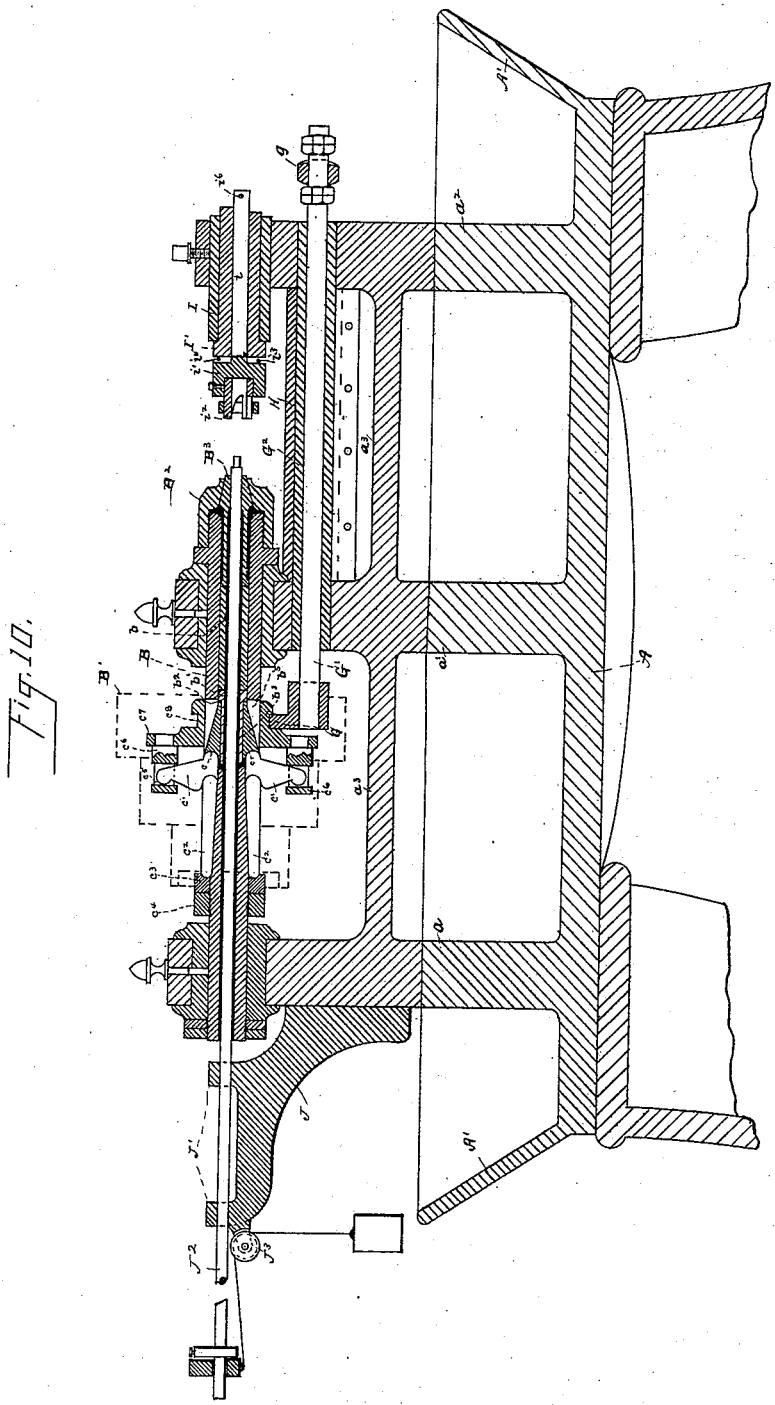

In the accompanying drawings, Figure 1 is a side view, in elevation, of my improved machine. Fig. 2 is a plan view of the same. Fig. 3 is a right-hand end elevation. Figs. 4 and 5 are elevations in transverse section on the line of $x\,x$, Fig. 2, the former showing the left-hand and the latter the right-hand portion. Fig. 6 is a plan view of the disk, showing the cams or inclines arranged on the periphery. Fig. 7 is a transverse section of the sleeves and the spindle and an elevation of the stud and roller connected with the inner sleeve. Fig. 8 is a transverse section through the spindle-and-chuck mechanism on the line of $x\,x$, Fig. 1. Fig. 9 is a plan view of the combination-tool for severing the threaded screws and at the same time turning down the blank from the body of the succeeding screw. Fig. 10 is an elevation in longitudinal section on the line of $y\,y$, Fig. 2.

A represents the base of the machine, mounted upon suitable legs, and provided with an upwardly-projecting rim, A', forming a catch-basin for oil.

The standards $a$, $a'$, and $a^2$ are preferably integral with the base and with the cross bars or braces $a^3$.

B is a hollow spindle journaled in suitable boxes mounted on the standards $a$ and $a'$. This spindle has a driving-cone, B', (shown in dotted lines,) and has attached the chuck for holding the blank rod.

C is a shaft journaled in the three uprights $a$, $a'$, and $a^2$, and has mounted thereon the cam-disks D, E, and F and worm-gear C'. The latter engages a worm, $C^2$, on the shaft $C^3$, the latter having a driving-cone, $C^4$. The movement of the shaft C is continuous in one direction. The spindle B, by means of suitable mechanism, (not shown,) is reversed, running alternately in opposite directions. The spindle B and shaft C are intended to be parallel and of the same elevation. The cam-disk D controls the movement of the combination-tool that sizes the rod forming the body of the screw, and at the same time severs the finished screw, and also controls the stop that engages the end of the blank rod and gages the length of the screw. The cam-disk E controls the screw-threading die, and also actuates the shifting mechanism for reversing the spindle B. The cam-disk F actuates the mechanism for operating the chuck connected with the spindle B.

Extending to the left hand from the standard $a$ is the arm J, having ribs J', each having a hole in line with the bore of the spindle B, and through which passes loosely the blank rod $J^2$. The parallel rods $j$ are secured to the ribs J', and form guides for the cross-head $j'$. The cross-head has a central hole, through which the blank rod passes loosely. A collar, $j^2$, is placed on the rod $J^2$, and secured by a thumb-screw next to and on the right-hand side of the cross-head. A cord is attached to the cross-head, and leads over the pulley $j^3$, and has a weight attached, by means of which, when the chuck-jaws are opened, the rod $J^2$ is pushed through the spindle B and against a stop, hereinafter described. When the rod $J^2$ is fed into the machine until the collar $j^2$ comes in contact with the arm J, the cross-head is drawn back to the left hand, and the collar is moved along the rod in position again by the side of the cross-head and fastened. When the rod is fed into the machine until there is no longer room for attaching the collar, another rod, with the collar attached, is placed in position, and the last rod forces the preceding one along through the spindle. In cutting short screws only about an inch of the rod is wasted.

The chuck for holding the blank rod and the mechanism connected therewith are as follows: The chuck-head $B^2$ is screwed onto the end of the spindle B, and has a conical bore for receiving the outer end of the jaws $B^3$, that are made of a corresponding shape. These jaws are usually three in number, and are made from a solid block of steel, that is bored and slitted to near the inner end, where the jaws are left integral. The jaws, when forced outward, by engaging the conical bore of the head, are compressed and made to grasp the blank; but when such end-pressure is reversed the jaws, by means of their elasticity and of the abruptness of the inclines on the ends thereof, and the abrupt inclination of the engaging conical inner surface of the chuck-head, will back away from the head far enough to open or regain their normal condition. It is evident that if the said internal conical surface of the head were almost perpendicular to the axis of the chuck the jaws would not be compressed or closed by forcing them against the head, and, on the other hand, if the said internal surface of the chuck-head were nearly parallel with the axis of the chuck, the jaws would have little tendency to back out of the head by reason of an outward pressure or recoil of the shanks of the jaws; but suppose the said internal conical face of the chuck-head were inclined, say, at an angle of about forty-five degrees to the axis of the chuck, it is evident that if the jaws were forced into such a cone they would be compressed or closed, and it is equally evident that if the jaws or the shanks of the jaws were stiff springs the outward pressure or recoil of these springs or jaws, after having been compressed, and the pressure that forces the jaws into the chuck-head having been removed, such outward pressure of the jaws acting on the said inclined inner walls of the chuck-head would cause the jaws to move rearward or back out of the head far enough to allow the jaws to open and regain their normal position. The jaws in thus backing out of the chuck-head would of course reverse the connecting mechanism that had forced the jaws into the head—to wit, the tube $b$, the rod $G'$, and the intermediate connecting parts. In operating the chuck it is therefore only necessary to force the jaws in the one direction—outward. A tube, $b$, is made to fit easily in the bore of the spindle, and abuts against the inner end of the jaws, and in turn is engaged by a second tube, $b'$. The left-hand end of this tube is reduced in size, leaving a square shoulder, $b^2$. Segmental bands $b^3$ fit on the reduced portion of the tube $b'$, and are of sufficient thickness in a radial direction to fill and slide easily in the bore of the spindle B. These segmental bands have respectively wings $b^4$, set radially, and operating in slots $b^5$, made on opposite sides of the spindle B. The ends of these wings have concaved seats that receive toes $c$ of levers $c'$. These levers are respectively fulcrumed on the push-bars $c^2$. The latter have rounded ends that are seated in depressions in the ring $c^3$, that may slide endwise on the spindle, but is backed by the collar $c^4$, that is screwed onto the spindle. The outer ends of the levers $c'$ are rounded, as shown in Fig. 10, and operate in slots $c^5$ of the studs $c^6$, that are attached to the cross-head $c^7$. This cross-head slides on the spindle B, and has a hub with an annular groove, $c^8$, that is engaged by an arm, G, that is attached to a rod, $G'$, for sliding the cross-head and operating the chuck. When the rod $G'$ is moved to the left hand, the cross-head $c^7$ and outer ends of the levers $c'$ are moved in the same direction. The inner ends of the levers of course move in the opposite direction from the outer ends of the levers, said levers being fulcrumed, as aforesaid, at the extremes of the push-bars $c^2$, and by means of the connecting mechanism already described—to wit, the tube $b$ and segmental bands $b^3$—move the jaws outward, and thereby compress or close them, causing them to grasp the blank rod. With the reverse movement of the lever $G'$, the jaws of the chuck are released and back themselves away from the chuck-head, and release the blank, as aforesaid. By adjusting the collars $c^4$ on the spindle B the chuck-jaws may be forced more or less into the head B, and consequently made to grasp a longer or smaller rod within a limited range. The rod $G'$ passes through the sleeve $G^2$, that is secured in the standards $a'$ and $a^2$. The rod is pivoted to the lever $g$, that is fulcrumed in the stud $g'$, extending from the standard $a^2$. The rear end of this lever has an upwardly-projecting stud and friction-roller, $g^2$, journaled therein, that engages the cam-blocks $f$ and $f'$, arranged on the periphery of the disk F. The front end of the lever terminates in a handle, $g^3$, for operating the chuck by hand—as, for instance, in starting the machine. At the proper time the cam-block $f$ engages the roller $g^2$, and actuates the lever $G'$ in the direction that opens the chuck, and retains the parts in such position long enough for the blank rod to be advanced through the spindle, immediately after which the cam-block $f'$ engages the roller, and closes the chuck.

Upon the sleeve $G^2$ is journaled the rock-shaft H, having an arm, $H'$, extending forward for supporting the tool-post $H^2$, and an arm, $H^3$, extending rearward, to which is attached the stop $h$. An extension-arm, $h'$, is pivoted to the arm $H^3$, and adjusted vertically by the screw $h^2$, and has a lateral projecting stud on which is journaled the roller $h^3$, that engages the cam on the disk D. Another arm, $H^4$, usually extends rearward, and has a spring, $h^4$, attached for actuating the rock-shaft and attachment in the direction opposite to that caused by the cam D. The spring might be attached to one of the other arms of the rock-shaft, in which case the arm $H^4$ might be omitted. The roller $h^3$ is located directly under the disk D, and the latter has a depression, $d$, that in passing the roller allows the spring $h^4$ to elevate the roller some distance, by means of which the stop $h$ is brought opposite the mouth of the chuck, and this occurs just as the latter is opened, and the stop therefore limits the advance of the blank. Just as the chuck is closed, the shoulder $d'$ engages the roller $h^3$ and depresses the same, by means of which the stop is drawn back out of the way, and the tool K, attached to the tool-post $H^2$, is advanced to a position near the blank. From the point $d'$ to the point $d^2$ the face of the cam-disk is concentric with the shaft C, and the rock-arm consequently remains stationary while the roller $h^3$ is traveling over this part, and during this time the thread is cut on the blank. As the die is backed off the screw, the roller $h^3$ engages the sharp incline at $d^2$, by means of which the tool K is brought in contact with the blank and commences to cut. From the point $d^2$ onward the cam gradually depresses the roller $h^3$ and feeds the tool K to its work, resulting in severing the finished screw and cutting the blank down to the proper size for the body of the next screw.

The combination-tool K (shown in Fig. 9) is a flat bar of steel, and has a part, $k$, for severing the finished screw, and a cutting-edge, $k'$, for sizing down the rod for the body of the next screw. This cutting-edge $k'$ is held parallel with the blank, and at the proper inclination at which such tools are placed for cutting. The length of this cutting-edge corresponds with the length of the body of the screw, so that the body of the same is sized down at one operation. As this tool is advanced to its work, the point $k$ first engages the blank at the point where the finished screw is to be severed from the blank. This point $k$ is far enough in advance of the cutting-edge $k'$ so that the finished screw is severed at about the same time that the turning down of the body of the next screw is completed by the cutting-edge $k'$. When a new rod is put into the machine, the end thereof is only brought flush with the right-hand edge of this tool. Afterward the advance of the blank through the chuck is controlled by the stop $h$.

The screw-cutting mechanism is as follows: A sleeve, I, is secured in the standard $a^2$, and extends toward and in line with the spindle B. Inside of this sleeve is a second sleeve, I', that may slide endwise, but is prevented from turning by a stud, $I^2$, that is attached to the inner sleeve and extends through a slot, $I^3$, in the outer sleeve. On the outer end of this stud is mounted a roller, $I^4$, that is engaged by cam-blocks $e$ and $e'$ on the periphery of the disk E, by means of which the sleeve I' is moved endwise.

Through the sleeve I passes the spindle $i$, with a head, $i'$, in which is secured the threading-die $i^2$. The head $i'$ and the adjacent end of the sleeve I' have pins, respectively, $i^3$ and $i^4$, so that when the head $i'$ is next to the end of the sleeve these pins overlap and prevent the head from revolving. The outer end of the sleeve I' is cam-shaped, having a head like a screw and a shoulder, $i^5$. The spindle $i$ has a pin, $i^6$, passing laterally through it. When the head $i'$ is drawn to the left hand, so that the pins $i^3$ and $i^4$ do not engage each other, the spindle, the head, and die may revolve freely; but in this position the pin $i^6$ is brought near to the cam-shoulder $i^5$.

The operation of these parts is as follows: When the blank has been prepared for the die, as aforesaid, the cam-block $e$ engages the roller $I^4$, by means of which the sleeve I', the spindle $i$, the head $i'$, and die are all advanced together toward the chuck, and the die is forced against the end of the blank and commences to cut the thread. After the die is well started in its work the extreme throw of the cam-block $e$ is reached, and the sleeve I' consequently stops. The die, however, continues to advance, being drawn along by the thread it is cutting; but by the time it has cut the thread the required distance, the head $i'$ has advanced so far from the sleeve that the pins $i^3$ and $i^4$ are separated, after which the die revolves with the blank and cuts the thread no farther. Just as this occurs a cam-block, E', on the side of the disk E engages the roller $E^2$, that is mounted on a stud, $E^3$, extending laterally from the upright rod $E^4$, by means of which the rod is depressed. This rod slides in a suitable guide, and is connected with the shifting device before mentioned, that is so arranged that the depression of the rod $E^4$ reverses the spindle B. Just as this occurs the cam-block $e'$ engages the roller $I^4$, and causes it to move the sleeve to the right hand, which movement causes the shoulder $i^5$ to engage the pin $i^6$, by means of which the revolution of the spindle $i$ is stopped, and the die is consequently backed off of the screw. Just as this occurs the block E' releases the rod $E^4$, that is again elevated to its normal position by a spring or weight, (not shown,) thereby causing the spindle B to be again reversed. Next after this comes the advance of the tool K, already described.

By referring to the disk D, as shown in Fig. 4, it will be seen that fully two-thirds of the time required in making the screw is consumed in turning down the blank and severing the screw. This is unavoidable, as this portion of the work is necessarily comparatively slow. It will be also observed that when the tool K has performed its work it is instantaneously withdrawn.

Heretofore in machines of this class usually two separate tools were employed—the one for cutting down the blank to form the body of the screw, and the other for severing the finished screw. The latter first performed its work, after which the former was fed lengthwise of the blank in performing its work.

By reversing some portions of the machine each tool was in turn backed off by its respective feed mechanism, the backing off consuming considerable time. Now, with such construction, if the same time were allowed for each tool to do its cutting as is allowed the tool K, it is evident that four times as much time would be required for this part of the work as is required with my improved machine.

The machine from which the accompanying drawings were made has been some time in successful operation, and with it I am enabled to make about two thousand screws per day of ten hours. An oil-pump, M, elevates oil from the basin below and discharges it upon the blank.

The machine is simple, as compared with other machines of this class, and can be made at a greatly reduced initial cost.

What I claim is—

1. In a machine for making metal screws, in combination with a rock-shaft arranged with its axis parallel with the axis of the chuck-spindle, suitable mechanism for intermittently oscillating the rock-shaft, and a stop connected with the latter and arranged to limit the advance of the blank to gage the length of the screw, the parts being so arranged and timed that the stop is respectively advanced and withdrawn simultaneously with the opening and closing of the chuck, substantially as set forth.

2. In a machine for making metal screws, a rock-shaft and attached rock-arm, and a combination-tool mounted on the latter for severing the screw and shaping the body for the succeeding screw, in combination with cam mechanism for intermittently oscillating the rock-shaft, and so arranged that the combination-tool is slowly fed to its work and instantaneously withdrawn when its work is completed, substantially as set forth.

3. In a machine for making metal screws, a combination-tool consisting of two cutting-edges in different planes—one for severing the screw, having a face for dressing the top of the head thereof, and the other flat and adapted to size down the blank to form the body of the succeeding screw—in combination with suitable mechanism for moving the tool to and from the blank, substantially as set forth.

4. In a machine for making metal screws, in combination with a rock-shaft and rock-arms connected therewith, the latter extending in opposite directions, a combination-tool for severing the finished screw and sizing down the blank to form the body of a screw, and a stop for gaging the length of the screw, the said tool and stop being mounted, respectively, on the arms of the rock-shaft on opposite sides of the blank, substantially as set forth.

5. In a machine for making metal screws, the combination, with a rock-shaft and arms and a combination-tool and stop, mounted, respectively, on said arms, as indicated, of cam mechanism for actuating the rock-shaft, by means of which the combination-tool is slowly fed to its work and instantaneously withdrawn and the stop is advanced and withdrawn, respectively, simultaneously with the opening and closing of the chuck, substantially as set forth.

6. In a machine for making metal screws, in combination with a spindle and a chuck-head having inclined inner surface, jaws within said head bearing on said inclined surface, a rotating cross-head surrounding the spindle and having suitable means for shifting it longitudinally thereof, and levers arranged between said cross-head and the movable jaws, whereby on the shifting of said cross-head the said levers will be actuated by said cross-head to force forward or allow to retract said jaws, substantially as set forth.

7. In combination with spindle, movable jaws, cross-head, and interposed levers having movable fulcrums, the nut, screw-threaded on the spindle, for adjusting said fulcrums, levers, and jaws longitudinally of the spindle, according to the diameter of wire to be grasped, substantially as set forth.

8. In a machine for making metal screws, the combination, with a spindle and chuck, of levers for operating said chuck, a cross-head or slide mounted on the chuck-spindle and adapted to operate said levers, a rod mounted parallel with said spindle and having an arm engaging with said cross-head, a lever pivoted to said rod and to the base-frame of the machine, and a cam adapted to engage said lever and shift the rod and its connections, substantially as and for the purpose set forth.

In testimony whereof I sign this specification, in the presence of two witnesses, this 2d day of June, 1885.

JAMES B. CLYNE.

Witnesses:
G. W. SHUMWAY,
N. S. AMSTUTZ.